United States Patent
Iwamoto (10) Patent No.: US 8,710,974 B2
(45) Date of Patent: Apr. 29, 2014

(54) SOUND PRODUCING APPARATUS FOR VEHICLE

(75) Inventor: Taro Iwamoto, Kanagawa (JP)

(73) Assignee: Mazda Motor Corporation, Hiroshima (JP)

( * ) Notice: Subject to any disclaimer, the term of this patent is extended or adjusted under 35 U.S.C. 154(b) by 573 days.

(21) Appl. No.: 13/024,128

(22) Filed: Feb. 9, 2011

(65) Prior Publication Data

US 2011/0241868 A1    Oct. 6, 2011

(30) Foreign Application Priority Data

Mar. 30, 2010  (JP) .................................. 2010-078303

(51) Int. Cl.
*B60Q 1/26* (2006.01)
*B60Q 1/22* (2006.01)

(52) U.S. Cl.
USPC ..................... 340/463; 340/425.5; 340/384.1; 340/384.4; 705/14.1; 705/14.45

(58) Field of Classification Search
USPC ........................... 340/463–467, 384.1–384.73
See application file for complete search history.

(56) References Cited

U.S. PATENT DOCUMENTS

| | | | |
|---|---|---|---|
| 7,787,633 B2* | 8/2010 | Costello et al. | 381/61 |
| 8,018,328 B2* | 9/2011 | Goldstein et al. | 340/384.1 |
| 2007/0229235 A1* | 10/2007 | Hirai | 340/425.5 |

FOREIGN PATENT DOCUMENTS

| | | |
|---|---|---|
| JP | 2008-168676 A | 7/2008 |
| JP | 2009-040318 A | 2/2009 |

* cited by examiner

*Primary Examiner* — George Bugg
*Assistant Examiner* — Sharmin Akhter
(74) *Attorney, Agent, or Firm* — Studebaker & Brackett PC (57) ABSTRACT

A sound producing apparatus for a vehicle notifying a vehicle's approach outside the vehicle comprising an original-tone generating portion generating an original tone of a vehicle's approaching sound for recognition of a vehicle's approach, a modulation-tone generating portion generating a modulation tone from the original tone with a comb filter function which is configured to apply gains to frequency components so that a gain to be applied to a specified frequency component of a times-tone row which has frequencies of n-times of a fundamental frequency is greater than that to be applied to the other frequency component than the specified frequency component of the times-tone row, a sound-pressure setting portion setting a sound pressure of the approaching sound of the modulation tone, and a speaker producing outside the vehicle the vehicle's approaching sound of the modulation tone with the set sound pressure.

8 Claims, 8 Drawing Sheets

FIG. 4A
Original Tone

FIG. 4B
Comb Filter

FIG. 4C
Modulation Tone

FIG. 7A
Original Tone

FIG. 7B
Comb Filter

FIG. 7C
High-Pass Filter

FIG. 7D
Modulation Tone

FIG. 8A
Original Tone

FIG. 8B
Comb Filter

FIG. 8C
High-Pass Filter

FIG. 8D
Modulation Tone

_US 8,710,974 B2_

SOUND PRODUCING APPARATUS FOR VEHICLE

BACKGROUND OF THE INVENTION

The present invention relates to a sound producing apparatus for a vehicle, and more specifically relates to a sound producing apparatus which can be properly installed to a low-noise vehicle, such as an electric vehicle or hybrid vehicle, to notify an approach of the vehicle outside the vehicle.

This kind of low-noise vehicle produces a lower traveling noise than a conventional vehicle does, so there is a concern that pedestrians would not notice the vehicle approaching. Accordingly, it has been proposed that the vehicle produces a dummy traveling sound so that pedestrians or bicycle's riders can notice the vehicle approaching.

Japanese Patent Laid-Open Publication No. 2009-40318 discloses a technology of producing dummy sounds of a tire noise and an engine idling sound. Further, in a technology disclosed in Japanese Patent Laid-Open Publication No. 2008-168676, dummy sounds having a high frequency are produced for a close notification area where the distance from the approaching vehicle is relatively short, while dummy sounds having a low frequency are produced for a far notification area where the distance from the approaching vehicle is relatively long. In general, since the low-frequency sounds tend to be easily attenuated compared to the high-frequency sounds, it can be restrained that the dummy sounds are transmitted far away or widely by producing the dummy sounds of the high-frequency sounds with cutting the low-frequency sounds.

However, the dummy sounds are no more than noises for the surroundings of the vehicle, so that an advantage of superior silence of the low-noise vehicle may be deteriorated. Further, since the dummy sounds having the high frequency, which is generated from the dummy sounds, such as the tire noise or the engine idling sound, for imaging the vehicle by cutting the low-frequency sounds as described above, do not contain the low-frequency components very much, there is a concern that even if the pedestrians or the bicycle riders hear the dummy sounds, they would not properly recognize the dummy sounds, such as the tire noise or the engine idling sound. Accordingly, it would be difficult that the vehicle's approach can be recognized properly.

SUMMARY OF THE INVENTION

An object of the present invention is to provide a sound producing apparatus for a vehicle which can produce appropriate sounds for proper recognition of the vehicle's approach, restraining noise sounds from a sound producing device.

According to the present invention, there is provided a sound producing apparatus for a vehicle which notifies an approach of the vehicle outside the vehicle, comprising an original-tone generating device generating an original tone of a vehicle's approaching sound for recognition of a vehicle's approach, a modulation-tone generating device generating a modulation tone from the original tone generated by the original-tone generating device with a comb filter function which is configured to apply gains to frequency components so that a gain to be applied to a specified frequency component of a times-tone row which has frequencies of n-times (n: an integer which is 2 or greater) of a fundamental frequency constituting the original tone is greater than that to be applied to the other frequency component than the specified frequency component of the times-tone row, a sound-pressure setting device setting a sound pressure of the approaching sound of the modulation tone generated by the modulation-tone generating device, and a sound producing device producing outside the vehicle the vehicle's approaching sound of the modulation tone with the sound pressure set by the sound-pressure setting device.

According to the present invention, the greater gain is applied to the frequency component of the times-tone row having the frequencies of n-times of the fundamental frequency. Consequently, even if the approaching sound actually produced lacks the frequency component of the fundamental frequency, the human being can recognize the approaching sound as a sound containing this fundamental-frequency component due to the missing fundamental phenomenon. Accordingly, the appropriate sound for recognition of the vehicle's approach can be produced without applying the greater gain to the low-frequency component which has a tendency of being transmitted far away without being easily attenuated. Further, since the pedestrians and the like can recognize the approaching sound with the sound pressure greater than that of the approaching sound of the original tone, even if the approaching sound of the modulation tone is produced with the lower sound pressure as a whole, the pedestrians and the like can be had recognize the vehicle's approach easily. As described above, according to the present invention, by utilizing the missing fundamental phenomenon, the appropriate sound for recognition of the vehicle's approach can be produced, restraining the noises from the sound producing device.

According to an embodiment of the present invention, the modulation-tone generating device further has a high-pass-filter function which is configured to apply gains to frequency components so that a gain to be applied to a high frequency component which has a higher frequency than a threshold frequency is greater than that to be applied to a low frequency component which has a lower frequency than the threshold frequency, and the modulation-tone generating device generates the modulation tone from the original tone with the comb filter function and the high-pass-filter function. Thereby, since the modulation tone is generated from the original tone by combining the comb filter function and the high-pass-filter function, the sound pressure of the low-frequency component having the tendency of being transmitted far away without being easily attenuated can be decreased. Meanwhile, the missing fundament phenomenon can have the pedestrians and the like hear the fundamental-frequency sound and recognize the low-frequency-component sound with illusion. Accordingly, the pedestrians and the like can be had recognize the appropriate sound for recognition of the vehicle's approach which is very similar to the original tone, such as the tire noise or the engine idling sound, restraining the noises.

According to another embodiment of the present invention, the high-pass-filter function is configured to attenuate the low frequency component. Thereby, the sound pressure of the component having the lower frequency than the threshold frequency is decreased, so that it can be restrained that the low-frequency component of the approaching sound is transmitted far away. Consequently, the noises can be restrained more, and the pedestrians and the like can be had recognize the appropriate sound for recognition of the vehicle's approach which is very similar to the original tone, such as the tire noise or the engine idling sound, with illusion due to the missing fundament phenomenon.

According to another embodiment of the present invention, the comb filter function is configured to apply a greater gain to a frequency component which has frequencies at regular intervals in the times-tone row. Thereby, the missing fundamental phenomenon can be generated more effectively.

According to another embodiment of the present invention, the sound producing apparatus further comprises a distance detecting device detecting a distance between the vehicle and a pedestrian, wherein the modulation-tone generating device is configured to perform at least one of increasing the threshold frequency of the high-pass-filter function and decreasing the gain to be applied to the low frequency component which has the lower frequency than the threshold frequency of the high-pass-filter function when the distance between the vehicle and the pedestrian is shorter. Thereby, the shorter the distance between the vehicle and the pedestrian (including the bicycle rider or the like) is, the more the lower frequency component contained in the approaching sound is decreased. Consequently, the closer the pedestrian (including the bicycle rider or the like) is, the less the approaching sound is transmitted. Accordingly, the pedestrian (including the bicycle rider or the like) can be had recognize the vehicle's approach properly, and the noises can be further restrained.

According to another embodiment of the present invention, the sound producing apparatus further comprises a surroundings sound-pressure measuring device measuring a sound pressure in surroundings of the vehicle, wherein the modulation-tone generating device is configured to perform at least one of increasing the threshold frequency of the high-pass-filter function and decreasing the gain to be applied to the low frequency component which has the lower frequency than the threshold frequency of the high-pass-filter function when the sound pressure in surroundings is lower. Thereby, the lower the sound pressure in surroundings of the vehicle is, the more the lower frequency component contained in the approaching sound is decreased. Consequently, the approaching sound is not transmitted far away, so that the noises can be restrained in case the surroundings are silent.

According to another embodiment of the present invention, the sound producing apparatus further comprises a memory to store data for generating the original tone of the vehicle's approaching sound in accordance with a traveling state of the vehicle, wherein the original-tone generating device generates the original tone of the vehicle's approaching sound based on the data of the vehicle's traveling state from the memory. Thereby, the original tone according to the vehicle's traveling state is generated. Consequently, the pedestrians and the like can be had recognize the vehicle's traveling state, such as a vehicle's traveling speed or acceleration, by the approaching sound as well.

Other features, aspects, and advantages of the present invention will become apparent from the following description which refers to the accompanying drawings.

DETAILED DESCRIPTION OF THE INVENTION

Hereinafter, preferred embodiments of the sound producing apparatus for a vehicle of the present invention will be descried referring to the accompanying drawings.

Embodiment 1

Figure 1:
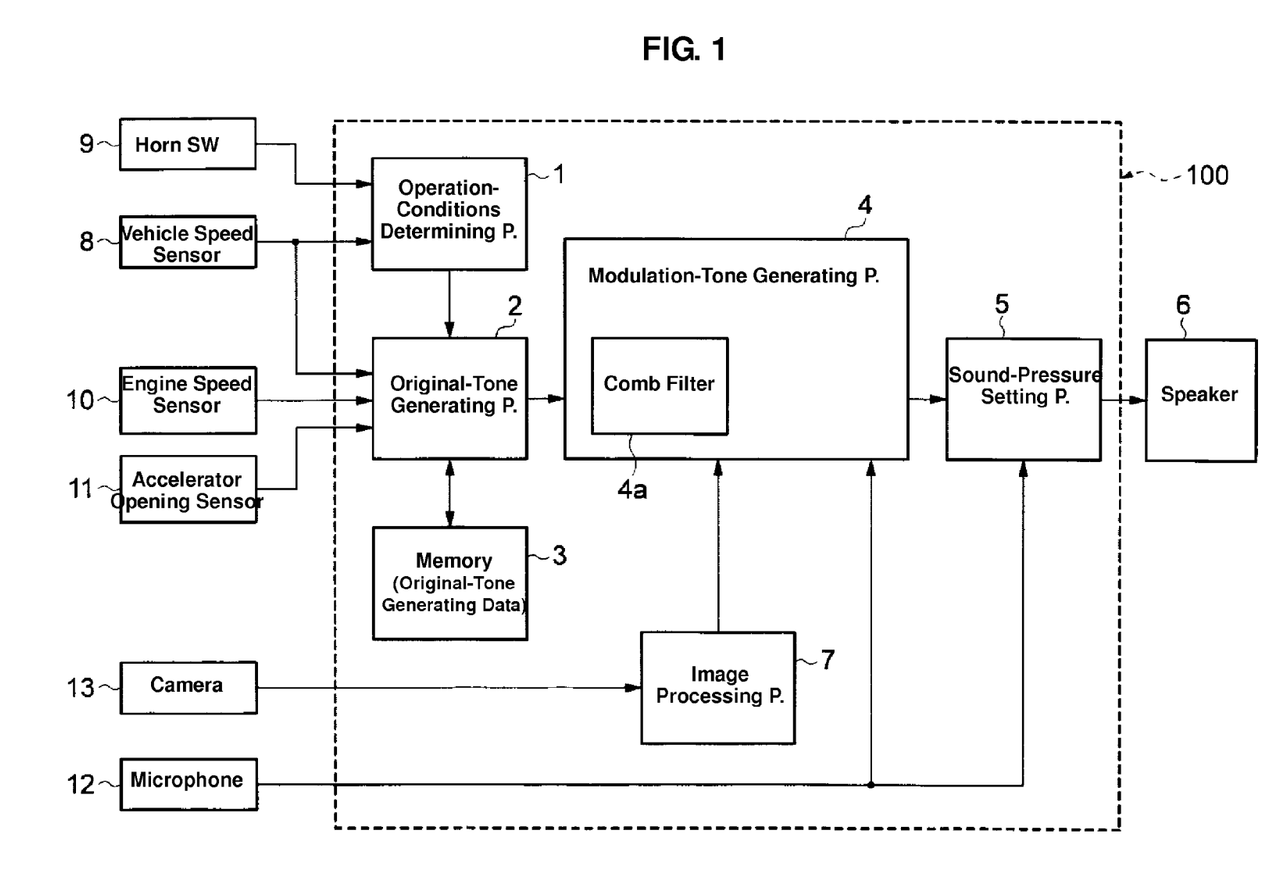
FIG. 1 is a block diagram showing a constitution of a sound producing apparatus for a vehicle according to a first embodiment of the present invention.

A constitution of a sound producing apparatus for a vehicle according to a first embodiment of the present invention will be described referring to FIG. 1. FIG. 1 is a block diagram showing the constitution of the sound producing apparatus for a vehicle according to the first embodiment of the present invention.

The sound producing apparatus for a vehicle which notifies an approach of the vehicle outside the vehicle according to the first embodiment, as shown in FIG. 1, comprises an operation-condition determining portion 1, an original-tone generating portion 2 which generates an original tone of an approaching sound for recognition of a vehicle's approach, a memory 3 which stores data for generating the original tone, a modulation-tone generating portion 4 which generates a modulation tone from the original tone, a sound-pressure setting portion 5 which sets a sound pressure of the modulation tone, and a speaker 6 which is a sound producing device to produce outside the vehicle the vehicle's approaching sound of the modulation tone with the set sound pressure. The sound producing apparatus for a vehicle further comprises an image processing portion 7 which is a distance detecting device to detect a distance between the vehicle and a pedestrian.

The above-described operation-condition determining portion 1, original-tone generating portion 2, modulation-tone generating portion 4, sound-pressure setting portion 5, and image processing portion 7 correspond to respective processing functions of an onboard ECU (electric control unit) 100 of the vehicle, for example. These processing functions may be executed by a specified program stored in a computer or a micro chip.

Figure 2:
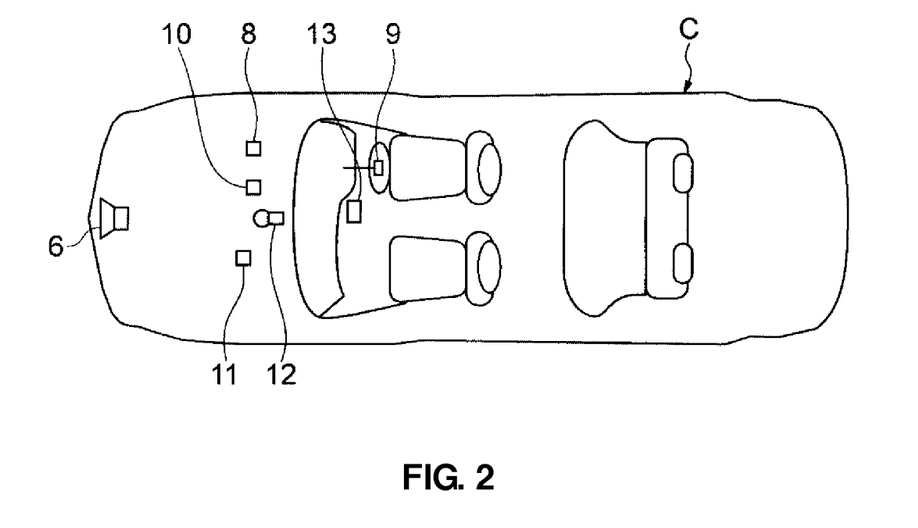
FIG. 2 is a plan view schematically showing an arrangement of sensors in the vehicle according to the first embodiment of the present invention.

The operation-condition determining portion 1 determines whether conditions for producing the approaching sound are met or not. One of the determination conditions may be that a vehicle speed detected by a vehicle speed sensor 8 is a specified standard speed or lower, for example, 20 km/h or lower. Herein, the vehicle speed sensor 8 is provided in an engine room at a front of a vehicle C as shown in FIG. 2. FIG. 2 is a schematic plan view of the vehicle.

Another condition of the conditions may be that a horn switch 9 is operated even in case of a vehicle stop. This is because it may be preferable that any pedestrian or the like around the vehicle, especially in front of the vehicle, be had recognize a vehicle's start when the vehicle starts moving forward. Accordingly, the approaching sound produced by the sound producing device may be used as a device of gently warning more appropriately than horning. Herein, the horn switch (horn SW) 9 is provided at a steering wheel in front of a driver's as shown in FIG. 2.

The original-tone generating portion 2 reads the data for generating the original tone in accordance with the vehicle's traveling state from the memory 3 and generates the original tone. The data for generating the original tone is stored in the memory 3 by being associated with the vehicle's traveling state. The vehicle's traveling state may comprise the vehicle speed detected by the vehicle speed sensor 8, an engine speed detected by an engine speed sensor 10 (or an engine output), and an accelerator opening detected by an accelerator opening sensor 11. Herein, the engine speed sensor 10 and the accelerator opening sensor 11 are provided in the engine room of the front of the vehicle C as well as the vehicle speed sensor 8 as shown in FIG. 2.

In the present embodiment, the memory 3 stores the data for generating the original sound in association with at least one of the vehicle speed, the engine speed and the accelerator opening. Accordingly, the original-tone generating portion 2 reads the data for generating the original tone associated with at least one of the vehicle speed, the engine speed and the accelerator opening, and generates the original tone in accordance with the vehicle speed and so on. Herein, the data for generating the original sound may be generated by using recorded sound data of the tire noise or the engine sound of the actual vehicle traveling, or combination of those.

The modulation-tone generating portion 4 generates a modulation tone from the original tone. Thus, the modulation-tone generating portion 4 comprises a comb filter function 4a. This comb filter function 4a is configured to apply gains to frequency components so that a gain $g_1$ to be applied to a specified frequency component of a times-tone row which has frequencies $f_1, f_2, f_3, \ldots$ of n-times (n: an integer which is 2 or greater) of a fundamental frequency $f_0$ (herein, the fundamental frequency $f_0$ is a frequency which constitutes the original tone. For example, this is a peculiar frequency of the original tone which is obtained from the original tone through the Fourier transformation) is greater than that a gain $g_2$ to be applied to the other frequency component than the specified frequency component of the times-tone row. For example, in case the fundamental frequency $f_0$=100 Hz, the higher gain is applied to the frequency component of the times-tone row $f_1$=200 Hz, $f_2$=300 Hz, $f_3$=400 Hz . . . .

This comb filter function 4a is used to generate the missing fundamental phenomenon. According to the missing fundament phenomenon, in case the human being is had hear the sound of the times-tone row lacking the fundamental frequency $f_0$, the human being can recognize the sound as if he or she can hear the fundamental frequency $f_0$ despite no producing of the fundamental frequency $f_0$ actually. For example, in case the human being hears the sound comprising 1000 Hz, 1100 Hz, 1200 Hz, . . . , the sound of 100 Hz which is the greatest common measure of these frequencies can be recognized by the human being.

Further, it is preferable that the comb filter 4a apply the greater gain to the frequency component which has frequencies at regular intervals in the times-tone row. For example, it is preferable that intervals of the frequencies of the times-tone row $f_1, f_2, f_3, \ldots$ be set at 100 Hz regularly. Thereby, the missing fundamental phenomenon can be generated more effectively. Moreover, it may be preferable that the fundamental frequency $f_0$ of the comb filter function 4a be set at a peculiar frequency of the engine sound of the vehicle. Thereby, the pedestrians and the like can recognize the vehicle's approach properly.

The modulation-tone generating device 4 generates the modulation tone from the original tone by using the comb filter function 4a. The generated modulation tone can be recognized by the human being as the approaching sound with the greater gain applied to the component of the fundamental frequency $f_0$ due to the missing fundamental phenomenon even though the actually-produced approaching sound contains the fundamental frequency $f_0$ to which the greater gain is not applied. Accordingly, the appropriate sound for recognition of the vehicle's approach can be produced without applying the greater gain to the low-frequency component which has the tendency of being transmitted far away.

The sound-pressure setting portion 5 sets a sound pressure of the approaching sound of the modulation tone. Herein, it is preferable that the sound pressure set be slightly greater than a sound pressure in the surroundings of the vehicle. This sound pressure of the surroundings may be measured by a microphone 12 as a surroundings sound-pressure measuring device. This microphone 12 is provided right before a vehicle's windshield at a central portion, in a vehicle width direction, of the vehicle as shown in FIG. 2.

Further, since the greater gain is applied to the component of the frequencies of the times-tone row $f_1, f_2, f_3, \ldots$ and the missing fundamental effect is utilized, the pedestrians and the like can easily recognize the approaching sound even if the approaching sound of the modulation tone is produced with a lower sound pressure as a whole. Consequently, the sound pressure can be restrained.

In case a vehicle's headlight is turned on, the pedestrians and the like generally recognize the vehicle's approach by the light of the vehicle's headlight. In this case, it may be unnecessary to produce a large approaching sound. Accordingly, in case an image processing portion 7 process images picked up by a camera 13 and it is determined that it is now in the night and the vehicle's headlight is turned on by this processing, it may be preferable that the sound pressure be set at the one which is lower than that in the daytime. This camera 13 is arranged at a central position inside the windshield near a ceiling of a vehicle room and directed forwardly.

Further, in case another vehicle producing its approaching sound exits near the own vehicle, the sound pressures produced by the both vehicles would improperly large if the both vehicles tried to set a greater sound pressure than the other for their own approaching sounds. Accordingly, it is preferable that some proper upper limit for the sound pressure be set in advance.

The speaker 6 produces outside the vehicle the vehicle's approaching sound of the modulation tone with the sound pressure set. Thereby, the appropriate sound for recognition of the vehicle's approach can be produced, restraining the noises from the sound producing device. The speaker 6 is positioned at a central position, in the vehicle width direction, of a vehicle front as shown in FIG. 2.

Figure 3:
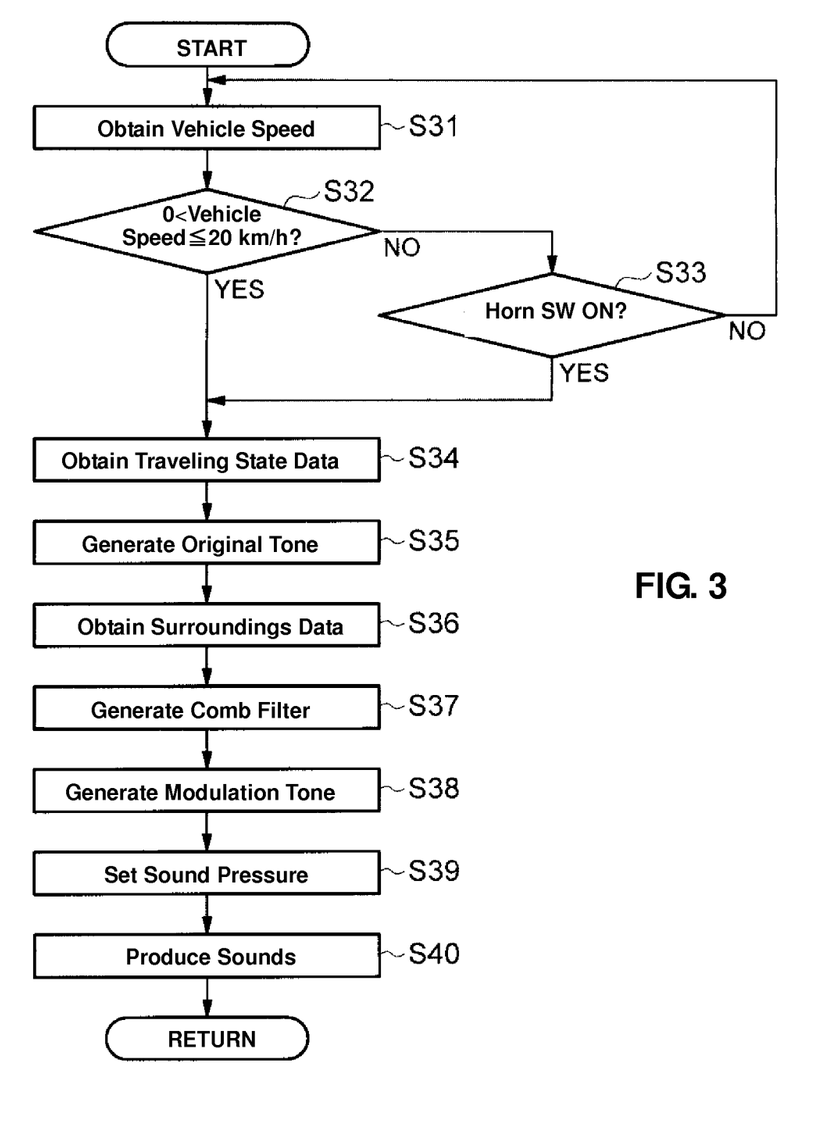
FIG. 3 is a flowchart showing an operation of the sound producing apparatus for a vehicle according to the first embodiment of the present invention.

Hereinafter, an operation of the sound producing apparatus for a vehicle according to a first embodiment will be described referring to FIG. 3.

First, the operation-condition determining portion 1 obtains the vehicle speed from the vehicle speed sensor 8 (S31). Next, the operation-condition determining portion 1 determines whether the conditions of $0<V\leq20$ km/h regarding the vehicle speed V is met or not (S32). When these conditions are not met (NO in S32), the operation-condition determining portion 1 determines whether the horn switch (horn SW) 9 is operated (turned on) or not (S33).

When the above-described conditions of the vehicle speed is met (YES in S32) or the horn switch 9 is operated (YES in S33), the original-tone generating portion 2 obtains the data of the vehicle traveling state (S34). The vehicle traveling state's data include the vehicle speed, the engine speed, and the accelerator opening.

Figure 4A:
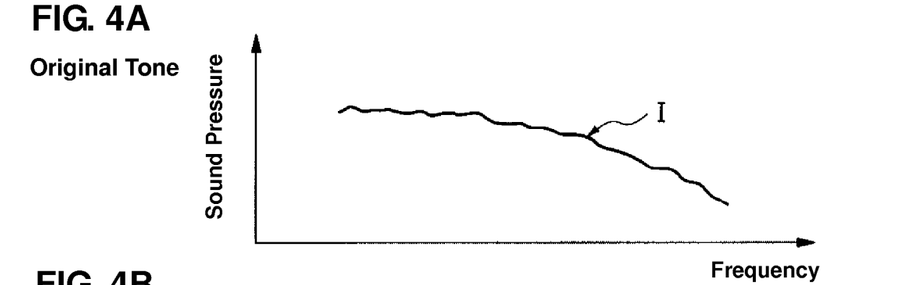
FIG. 4A is a graph showing a frequency distribution of a sound pressure of an original tone according to the first embodiment.

Next, the original-tone generating portion 2 reads the data for generating the original tone in accordance with the vehicle traveling state obtained from the memory 3 and generates the original tone (S35). FIG. 4A schematically shows a graph of the original tone generated. The axis of abscissas of this graph shows the frequency, and the axis of ordinates of the graph shows the sound pressure. A curve I in the graph shows frequency characteristics of the sound pressure of the original tone.

Subsequently, the surroundings data obtained through the processing of the images picked up by the camera 13 with the processing portion 7 and the surroundings sound pressure data detected by the microphone 12 are obtained (S36).

Figure 4B:
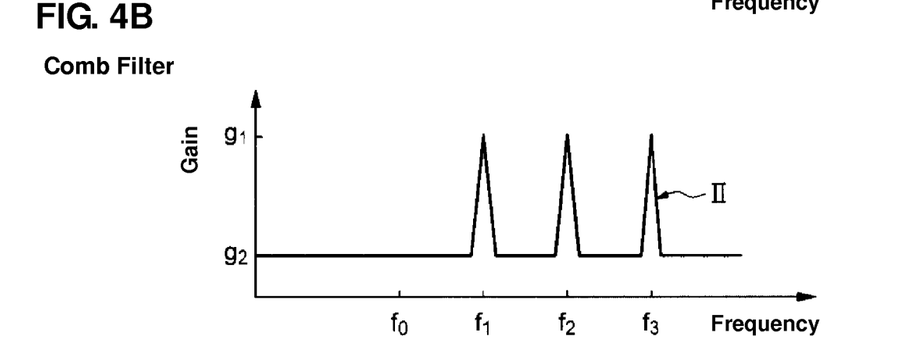
FIG. 4B is a graph showing a frequency distribution of a gain of a comb filter according to the first embodiment.

Next, the modulation-tone generating device 4 generates characteristics of the comb filter function 4a (S37). FIG. 4B schematically shows a graph showing characteristics of the comb filter function 4a. The axis of abscissas of this graph shows the frequency, and the axis of ordinates of the graph shows the gain. A line II in the graph shows frequency characteristics of the gain of the comb filter function 4a. As shown in this line II, according to the comb filter function 4a, the great gain $g_1$ is applied to the frequency component of the frequencies of the times-tone row $f_1$, $f_2$, $f_3$ and the small gain $g_2$ is applied to the frequency component of the other frequencies. Herein, it may be set such that the gain $g_1=1.2$ dB and the gain $g_2=0.0$ dB. Herein, the characteristics of the comb filter function 4a may be generated at each time or obtained from the data memorized in the memory.

Figure 4C:
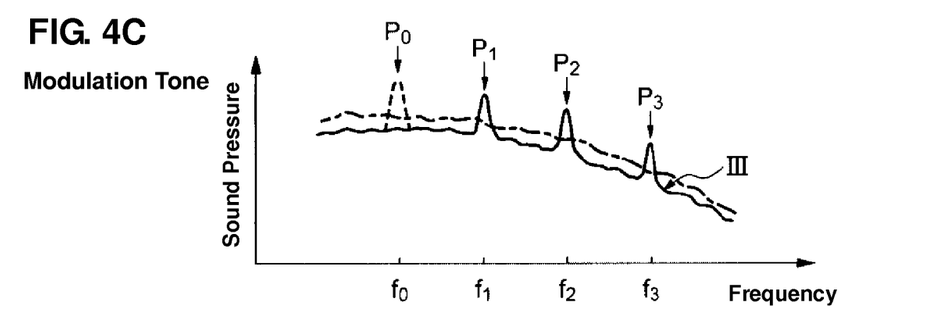
FIG. 4C is a graph showing a frequency distribution of a sound pressure of a modulation tone according to the first embodiment.

Then, the modulation-tone generating device 4 generates the modulation tone from the original tone with the comb filter function 4a (S38). FIG. 4C schematically shows a graph of the modulation tone generated from the original tone of FIG. 4A by using the comb filter function 4a of FIG. 4B. The axis of abscissas of this graph shows the frequency, and the axis of ordinates of the graph shows the sound pressure. A curve III in the graph shows frequency characteristics of the sound pressure of the modulation tone. As shown in the curve III, the modulation tone has respective sound pressure's peaks $p_1$, $p_2$, $p_3$ at the frequencies $f_1$, $f_2$, $f_3$ with its base of the original tone. Accordingly, the human being hearing the approaching sound of the modulation tone recognizes the sound of the fundamental frequency $f_0$ with the greater sound pressure than that of the original tone due to the missing fundamental phenomenon. That is, the human being recognizes the approaching sound which is similar to the one which is generated in case the peak $p_0$ of the fundamental frequency $f_0$ illustrated by a broken line is added to the actual modulation tone shown by the curve III, and the human being recognizes the approaching sound having the greater sound pressure, over an entire frequency range, than the sound pressure shown by the curve I of FIG. 4A (as illustrated by one dotted broken line in FIG. 4C). Accordingly, the corresponding sound pressures are reduced, so that the noises can be restrained, having the pedestrians recognize the similar approaching sound.

Next, the sound-pressure setting portion 5 sets the sound pressure of the approaching sound of the modulation tone (S39). Herein, it is preferable that the sound-pressure setting portion 5 set the sound pressure at a value slightly greater than the surroundings sound pressure measured by the microphone 12. Further, it is preferable that the sound pressure be set at a smaller sound value in case it is determined by the image processing portion 7 processing images picked up by the camera 13 that it is now in the night and the vehicle's headlight is turned on.

Further, as shown by the curve III in FIG. 4C, the modulation tone has the sound pressure peaks ($p_1$, $p_2$ and $p_3$) at the times-tone row, and the sound of the fundamental frequency $f_0$ can be recognized due to the missing fundamental phenomenon. Accordingly, it may be considered that the pedestrians and the like can be had recognize the vehicle's approach properly even if the sound pressure is set at a lower pressure than that in case where these sound peaks do not exist.

Next, the speaker 6 produces the approaching sound of the modulation tone outside the vehicle with the set sound pressure (S40). Thereby, the appropriate sound for recognition of the vehicle's approach can be produced, restraining the noises from the sound producing device.

Embodiment 2

Figure 5:
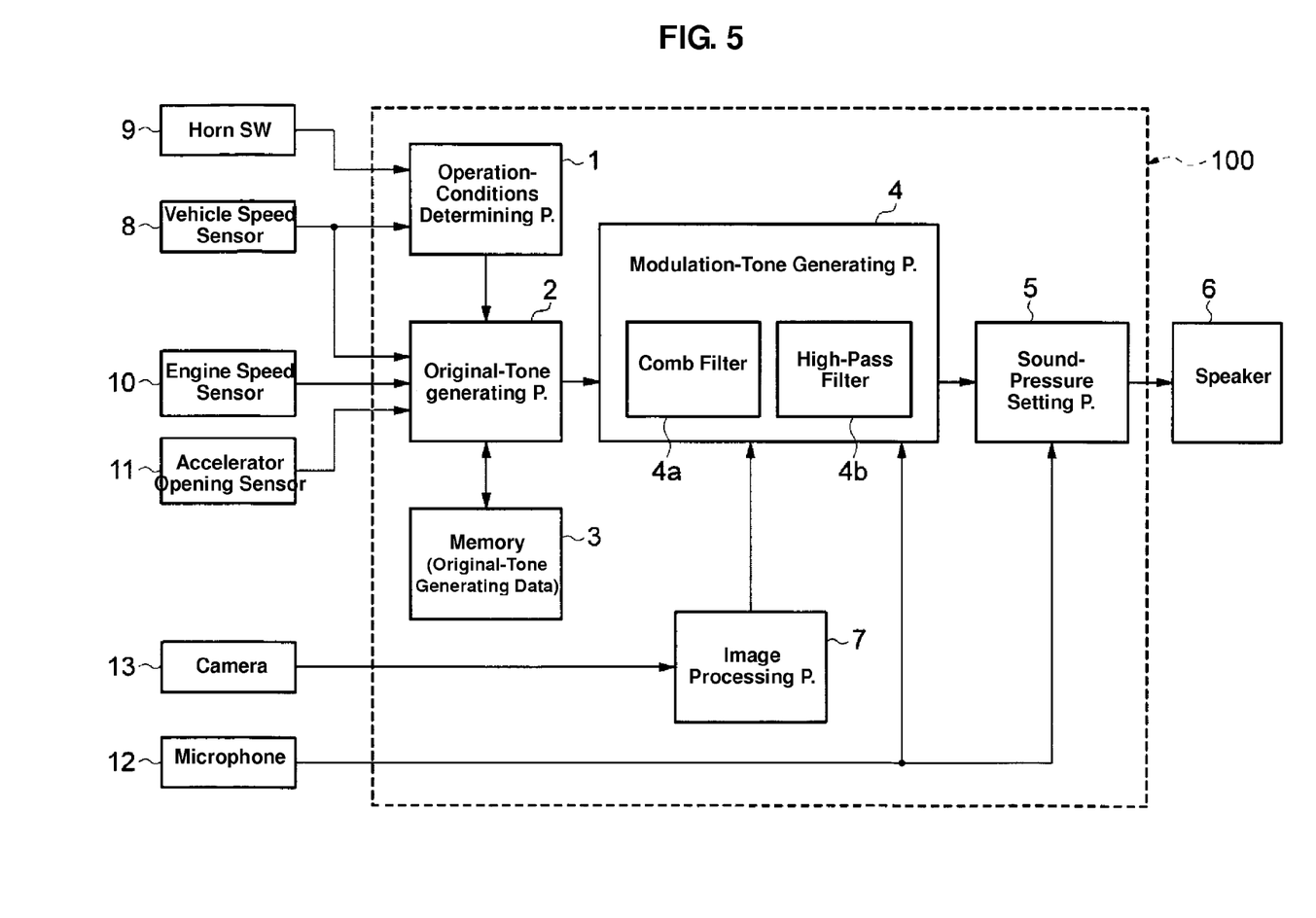
FIG. 5 is a block diagram showing a constitution of a sound producing apparatus for a vehicle according to a second embodiment of the present invention.
Figure 6:
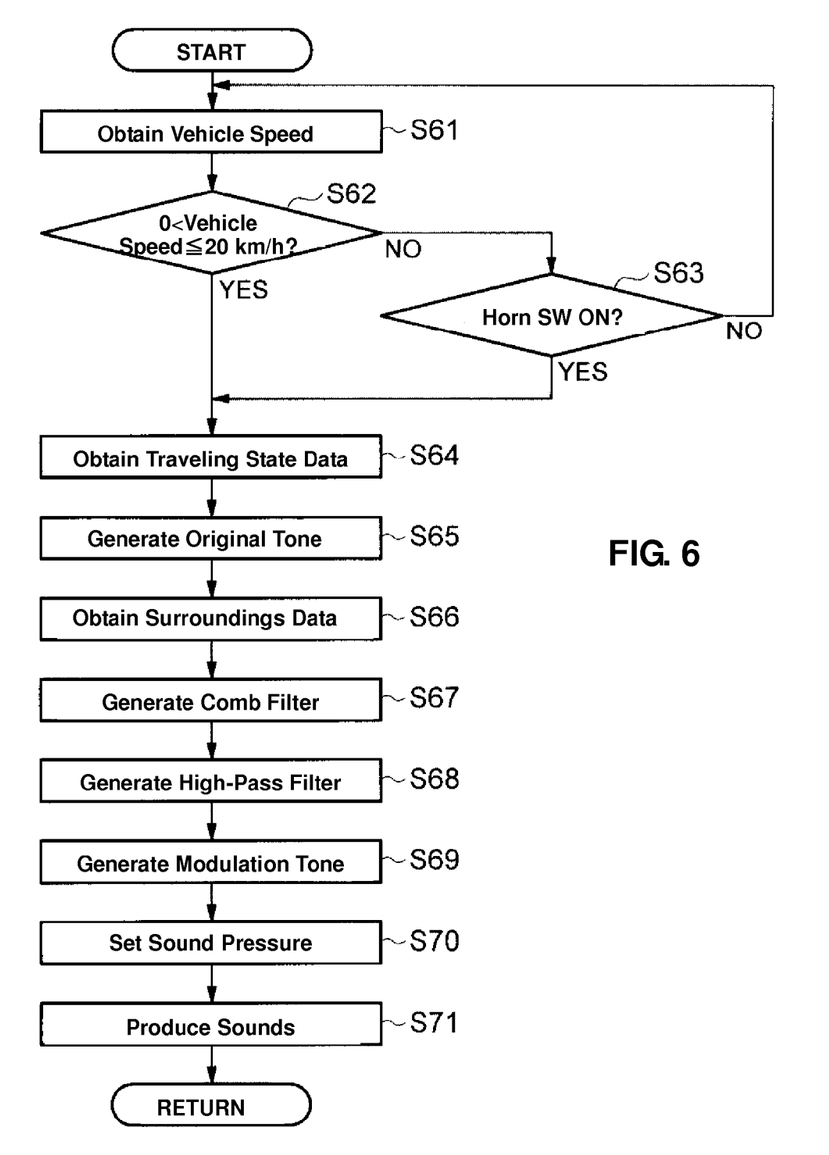
FIG. 6 is a flowchart showing an operation of the sound producing apparatus for a vehicle according to the second embodiment of the present invention.

A sound producing apparatus for a vehicle according to a second embodiment of the present invention will be described referring to FIGS. 5 through 7. FIG. 5 is a block diagram showing a constitution of the sound producing apparatus for a vehicle according to the second embodiment. This sound producing apparatus for a vehicle of the second embodiment has the same constitution as that of the first embodiment shown in FIG. 1 basically, except for the modulation-tone generating device 4 further having a high-pass-filter function 4b. Accordingly, specific discretions of the same components as those of the first embodiment are omitted here.

This high-pass-filter function 4b is configured to apply gains to frequency components so that a gain $g_3$ to be applied to a high frequency component which has a higher frequency than a threshold frequency $f_c$ is greater than a gain $g_4$ to be applied to a low frequency component which has a lower frequency than the threshold frequency $f_c$. It is preferable that the threshold frequency $f_c$ be between the fundamental frequency $f_0$ and the lowest frequency $f_1$ of the times-tone row.

Further, it is preferable that the characteristics of the high-pass-filter function 4b be adjusted in accordance with the distance between the vehicle and the pedestrian. Specifically, it is preferable that at least one of increasing the threshold frequency $f_c$ of the high-pass-filter function and decreasing the gain $g_4$ to be applied to the low frequency component which has the lower frequency than the threshold frequency $f_c$ of the high-pass-filter function be conducted when the distance between the vehicle and the pedestrian is shorter. Thereby, the low-frequency component contained in the approaching sound is decreased. Consequently, Thereby, the shorter the distance between the vehicle and the pedestrians and the like is, the more the lower frequency component contained in the approaching sound is decreased. Consequently, the closer the pedestrian is, the less the approaching sound is transmitted. Accordingly, the pedestrian can be had recognize the vehicle's approach properly, and the noises can be further restrained. Herein, a word of the "pedestrian" is used here as a wide meaning language so as to include a person standing, a bicycle rider, or the like.

The distance between the vehicle and the pedestrian can be preferably obtained through processing the images picked up by the camera 13 with the image processing portion 7. The distance may be also measured by a stereo type of camera. Further, a radar device or a lazar distance-measuring device may be used to measure the distance in addition to the camera 13.

Further, it is preferable that the characteristics of the high-pass-filter function 4b be adjusted in accordance with the sound pressure in the sound pressure in the surroundings of the vehicle. Specifically, it is preferable that at least one of increasing the threshold frequency $f_c$ of the high-pass-filter function and decreasing the gain $g_4$ to be applied to the low frequency component which has the lower frequency than the threshold frequency $f_c$ of the high-pass-filter function be conducted when the sound pressure in the surroundings of the vehicle is lower, i.e., it is more silent around the vehicle. Thereby, the lower the sound pressure in surroundings of the vehicle is, the more the lower frequency component contained in the approaching sound is decreased. Consequently, the approaching sound is not transmitted far away, so that the noises can be restrained in case the surroundings are silent.

The modulation-tone generating device 4 generates the modulation tone from the original tone with the comb filter function 4a and the high-pass-filter function 4b. Consequently, not only the component of the low sound range is more restrained than the component of the high sound range, but the peak sound pressure of the fundamental frequency of the low sound range which does not actually exist can be recognized due to the mixing fundamental phenomenon. Thereby, the appropriate sound for recognition of the vehicle's approach can be produced, restraining the noises from the sound producing device.

Figure 7A:
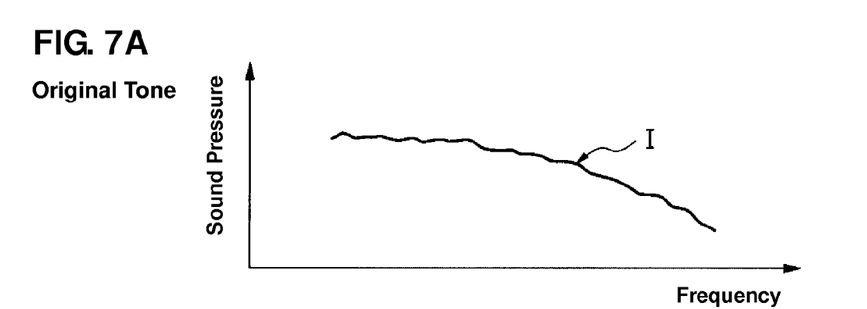
FIG. 7A is a graph showing a frequency distribution of a sound pressure of an original tone according to the second embodiment.
Figure 7B:
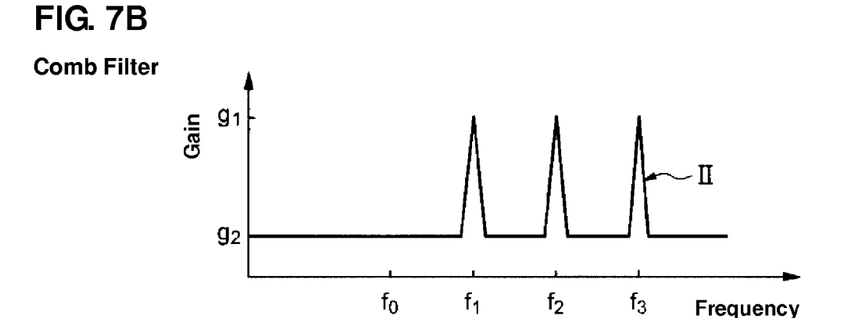
FIG. 7B is a graph showing a frequency distribution of a gain of a comb filter according to the second embodiment.

Hereinafter, an operation of the sound producing apparatus of the second embodiment will be described referring to a flowchart of FIG. 6. The operations of steps until a step S67 where the comb filter function is generated in this flowchart are the same as those until the step S37 of FIG. 3 of the first embodiment. In the second embodiment, an original tone shown by a curve I in FIG. 7A is generated in a step S65 in the same manner as the first embodiment, and a comb filter shown by a line II in FIG. 7B is generated in the step S67 in the same manner as the first embodiment.

Figure 7C:
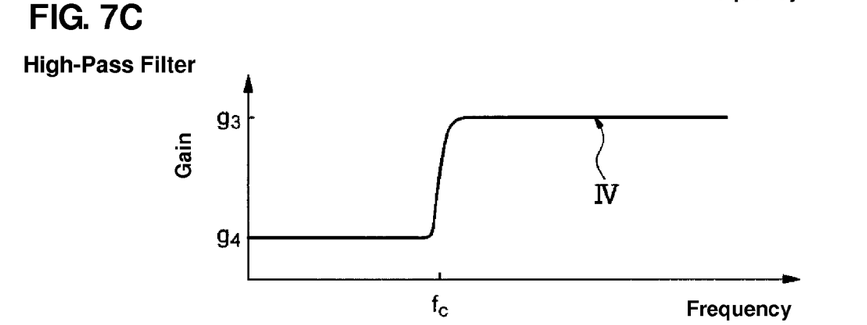
FIG. 7C is a graph showing a frequency distribution of a gain of a high-pass filter according to the second embodiment.

According to the second embodiment, the modulation-tone generating portion 4 further generates the high-pass-filter function 4b (S68). Herein, FIG. 7C schematically shows a graph showing characteristics of the high-pass-filter 4b. The axis of abscissas of this graph shows the frequency, and the axis of ordinates of the graph shows the gain. A line IV in the graph shows frequency characteristics of the gain of the high-pass-filter function 4b. This high-pass-filter function 4b is, as shown in the line IV, configured to apply gains to frequency components so that the gain $g_3$ to be applied to a high frequency component which has a higher frequency than the threshold frequency $f_c$ is greater than the gain $g_4$ to be applied to a low frequency component which has a lower frequency than the threshold frequency $f_c$. For example, it may be preferably set that the gain $g_3$=0.0 dB and the gain $g_4$=−3 dB. Accordingly, the sound pressure of the low sound range is restrained so that the approaching sound is not be transmitted far away.

It is preferable that the threshold frequency $f_c$ be between the fundamental frequency $f_0$ of the comb filter function 4a and the lowest frequency in the frequency components of the times-tone row to which the great gain is applied. Thereby, the sound pressure of the low sound range can be restrained, without hindering utilizing the mixing fundamental phenomenon.

Further, the shorter the distance between the vehicle and the pedestrians is or the lower the sound pressure in the surroundings of the vehicle is, the more the threshold frequency $f_c$ may be increased. Thereby, the shorter the distance between the vehicle and the pedestrians is or the lower the sound pressure in the surroundings of the vehicle is, the wider the low sound range having the restrained sound pressure is. Consequently, the approaching sound may not be transmitted far away. Meanwhile, the shorter the distance between the vehicle and the pedestrians is or the lower the sound pressure in the surroundings of the vehicle is, the more the gain $g_4$ to be applied to the low frequency component having the lower frequency than the threshold frequency $f_c$ may be decreased. Consequently, the closer the pedestrian is or the lower the sound pressure in the surroundings of the vehicle is, the sound pressure of the low sound range is restrained so that the approaching sound is not be transmitted far away.

Figure 7D:
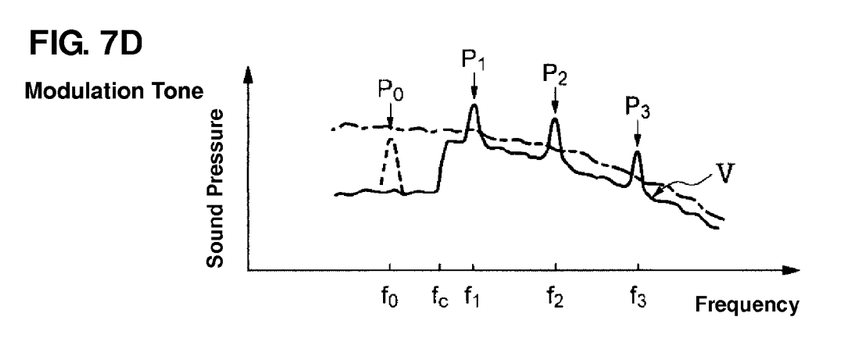
FIG. 7D is a graph showing a frequency distribution of a sound pressure of a modulation tone according to the second embodiment.

Then, the modulation-tone generating device 4 generates the modulation tone from the original tone with the comb filter function 4a and the high-pass-filter function 4b (S69). FIG. 7D schematically shows a graph of the modulation tone generated from the original tone. The axis of abscissas of this graph shows the frequency, and the axis of ordinates of the graph shows the sound pressure. A curve V in the graph shows frequency characteristics of the sound pressure of the modulation tone according to the second embodiment.

As shown in the curve V, the sound pressure of the modulation tone of the lower sound side than the threshold frequency $f_0$ is restrained. Thereby, the approaching sound of this modulation tone cannot be transmitted far away, so that the noises can be restrained properly. Further, the modulation tone has respective sound pressure peaks $p_1$, $p_2$, $p_3$ at the frequencies $f_1$, $f_2$, $f_3$ as shown by the curve V. Accordingly, the human being hearing the approaching sound of this modulation tone recognizes the sound of the fundamental frequency $f_0$ due to the missing fundamental phenomenon. That is, even if the sound pressure of the low sound range is restrained, the human being recognizes the approaching sound in the same manner as a case in which the approaching sound of the modulation tone having further the sound pressure peak $p_0$ at the fundamental frequency $f_0$ is produced as shown by the curve V. Consequently, as shown by a one-dotted broken line in FIG. 7D, the pedestrians and the like can be had recognize the appropriate sound for recognition of the vehicle's approach which is very similar to the original tone, such as the tire noise or the engine idling sound, restraining the noises.

Subsequently, the sound pressure is set (S70) and the approaching sound is produced (S71) in the same manner as the steps S39, S40 of FIG. 3 of the first embodiment. Accordingly, the appropriate sound for recognition of the vehicle's approach can be produced, restraining the noises from the sound producing device.

Embodiment 3

A sound producing apparatus for a vehicle according to a third embodiment of the present invention will be described referring to FIG. 8. This sound producing apparatus for a vehicle of the third embodiment is basically the same as that of the first embodiment shown in the block diagram of FIG. 1. An operation of the sound producing apparatus for a vehicle of the third embodiment is basically the same as that shown by the flowchart of FIG. 6.

Figure 8A:
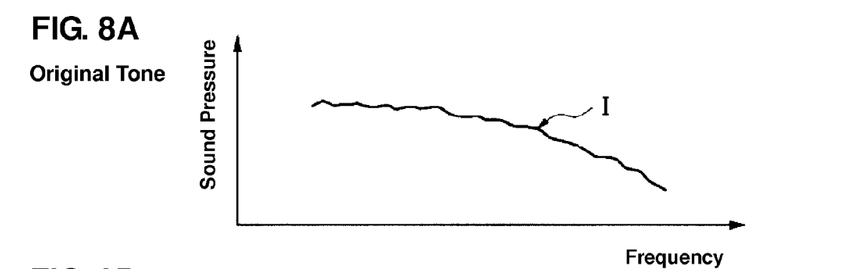
FIG. 8A is a graph showing a frequency distribution of a sound pressure of an original tone according to a third embodiment.
Figure 8B:
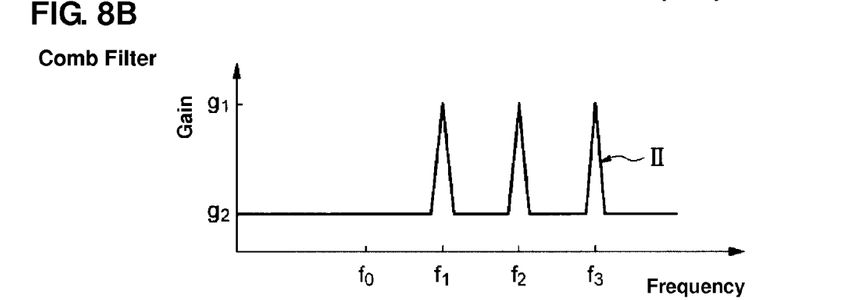
FIG. 8B is a graph showing a frequency distribution of a gain of a comb filter according to the third embodiment.

In the third embodiment, the original tone and the comb filter characteristics are generated as shown in FIGS. 8A and 8B in the same manner as the first or second embodiments. Herein, the characteristics of the high-pass-filter function 4b of the third embodiment differ from that of the second embodiment as shown by a curve VI in FIG. 8C. The high-pass-filter function 4b of the third embodiment is also configured to apply gains to frequency components so that a gain $g_5$ to be applied to the high frequency component which has the higher frequency than the threshold frequency $f_c$ is greater than a gain $g_6$ to be applied to a low frequency component which has the lower frequency than the threshold frequency $f_c$. Herein, however, the sound pressure of the low-frequency range is not attenuated, but the sound pressure of the high-frequency range is increased relatively. For example, it may be preferably set that the gain $g_5=1.2$ dB and the gain $g_6=0.0$ dB.

Figure 8C:
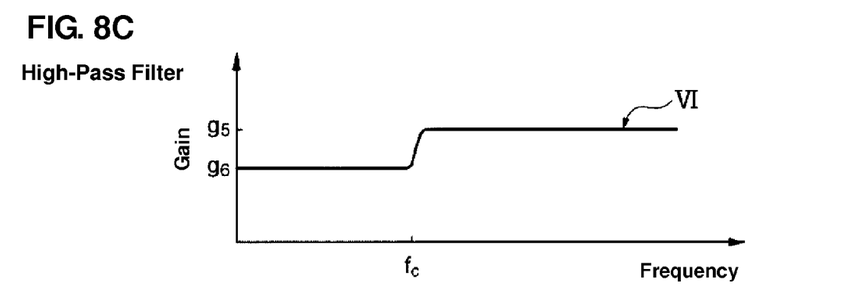
FIG. 8C is a graph showing a frequency distribution of a gain of a high-pass filter according to the third embodiment.
Figure 8D:
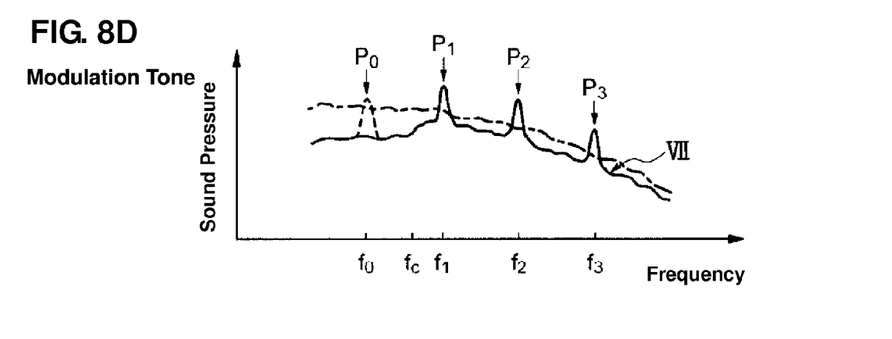
FIG. 8D is a graph showing a frequency distribution of a sound pressure of a modulation tone according to the third embodiment.

A wavelength distribution of the sound pressure of the modulation tone, which is generated from the original tone by using the comb filter function of FIG. 8B and the high-pass-filter function of FIG. 8C, is shown by a curve VII in FIG. 8D. As shown by this curve VII, the modulation tone has the sound pressure peaks ($p_1$, $p_2$ and $p_3$) of the times-tone row, and the sound of the fundamental frequency $f_0$ is recognized due to the missing fundamental phenomenon. Thereby, as shown by a one-dotted broken line in FIG. 8D, the appropriate sound for recognition of the vehicle's approach which is very similar to the original tone, such as the tire noise or the engine idling sound, can be properly recognized. Further, since the relatively great gain is applied to the high sound range, it may be considered that the pedestrian can be had recognize the vehicle's approach properly even if the sound pressure of the approaching sound is decreased as a whole. Accordingly, the appropriate sound for recognition of the vehicle's approach can be produced, restraining the noises from the sound producing device.

While the above-described embodiments describe examples in which the present invention is constituted with particular conditions, the present invention should not be limited to those. Any modification and improvements of the present invention may be applied. For example, the above-described embodiment describe the example in which the frequencies $f_1$, $f_2$, $f_3$, . . . of the times-tone row are at regular intervals, but an example in which these frequencies are at irregular intervals by omitting part of those may be applied. Further, while the above-described embodiments describe the example in which the modulation tone is generated by applying the great gain to the times-tone row for the single fundamental frequency, the present invention should not be limited to the single fundamental frequency, but the great gain may be applied to respective times-tone rows for plural fundamental frequencies and thereby the modulation tone may be generated.

The sound producing apparatus for a vehicle of the present invention can be properly installed to the low-noise vehicle, such as the electric vehicle or hybrid vehicle.

What is claimed is:

1. A sound producing apparatus for a vehicle which notifies an approach of the vehicle outside the vehicle, comprising:

an original-tone generating device generating an original tone of a vehicle's approaching sound for recognition of a vehicle's approach;

a modulation-tone generating device generating a modulation tone from the original tone generated by said original-tone generating device with a comb filter function which is configured to apply gains to frequency components so that a gain to be applied to a specified frequency component of a times-tone row which has frequencies of n-times (n: an integer which is 2 or greater) of a fundamental frequency constituting the original tone is greater than that to be applied to the other frequency component than the specified frequency component of the times-tone row;

a sound-pressure setting device setting a sound pressure of the approaching sound of the modulation tone generated by said modulation-tone generating device;

a sound producing device producing outside the vehicle the vehicle's approaching sound of the modulation tone with the sound pressure set by said sound-pressure setting device; and a distance detecting device detecting a distance between the vehicle and a pedestrian, wherein said modulation-tone generating device has a high-pass-filter function which is configured to apply gains to frequency components so that a gain to be applied to a high frequency component which has a higher frequency than a threshold frequency is greater than that to be applied to a low frequency component which has a lower frequency than the threshold frequency, and said modulation-tone generating device generates the modulation tone from the original tone with said comb filter function and said high-pass-filter function, and said modulation-tone generating device is configured to perform at least one of increasing said threshold frequency of the high-pass-filter function and decreasing said gain to be applied to the low frequency component which has the lower frequency than the threshold frequency of the high-pass-filter function when the distance between the vehicle and the pedestrian detected by said distance detecting device is shorter.

2. The sound producing apparatus for a vehicle of claim 1, wherein said high-pass-filter function is configured to attenuate said low frequency component.

3. The sound producing apparatus for a vehicle of claim 1, wherein said comb filter function is configured to apply a greater gain to a frequency component which has frequencies at regular intervals in said times-tone row.

4. The sound producing apparatus for a vehicle of claim 1, further comprising a memory to store data for generating the original tone of the vehicle's approaching sound in accordance with a traveling state of the vehicle, wherein said original-tone generating device generates said original tone of the vehicle's approaching sound based on said data of the vehicle's traveling state from the memory.

5. A sound producing apparatus for a vehicle which notifies an approach of the vehicle outside the vehicle, comprising:

an original-tone generating device generating an original tone of a vehicle's approaching sound for recognition of a vehicle's approach;

a modulation-tone generating device generating a modulation tone from the original tone generated by said original-tone generating device with a comb filter function which is configured to apply gains to frequency components so that a gain to be applied to a specified frequency component of a times-tone row which has frequencies of n-times (n: an integer which is 2 or greater) of a fundamental frequency constituting the original tone is greater than that to be applied to the other frequency component than the specified frequency component of the times-tone row;

a sound-pressure setting device setting a sound pressure of the approaching sound of the modulation tone generated by said modulation-tone generating device;

a sound producing device producing outside the vehicle the vehicle's approaching sound of the modulation tone with the sound pressure set by said sound-pressure setting device; and a surroundings sound-pressure measuring device measuring a sound pressure in surroundings of the vehicle, wherein said modulation-tone generating device has a high-pass-filter function which is configured to apply gains to frequency components so that a gain to be applied to a high frequency component which has a higher frequency than a threshold frequency is greater than that to be applied to a low frequency component which has a lower frequency than the threshold frequency, and said modulation-tone generating device generates the modulation tone from the original tone with said comb filter function and said high-pass-filter function, and said modulation-tone generating device is configured to perform at least one of increasing said threshold frequency of the high-pass-filter function and decreasing said gain to be applied to the low frequency component which has the lower frequency than the threshold frequency of the high-pass-filter function when the sound pressure in surroundings measured by said surroundings sound-pressure measuring device is lower.

6. The sound producing apparatus for a vehicle of claim 5, wherein said high-pass-filter function is configured to attenuate said low frequency component.

7. The sound producing apparatus for a vehicle of claim 5, wherein said comb filter function is configured to apply a greater gain to a frequency component which has frequencies at regular intervals in said times-tone row.

8. The sound producing apparatus for a vehicle of claim 5, further comprising a memory to store data for generating the original tone of the vehicle's approaching sound in accordance with a traveling state of the vehicle, wherein said original-tone generating device generates said original tone of the vehicle's approaching sound based on said data of the vehicle's traveling state from the memory.

* * * * *